(12) United States Patent
Huiszoon (10) Patent No.: US 7,573,027 B2
(45) Date of Patent: Aug. 11, 2009

(54) MEASUREMENT OF STANDOFF CORRECTED PHOTOELECTRIC FACTOR

(75) Inventor: Cornelis Huiszoon, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 72 days.

(21) Appl. No.: 11/780,993

(22) Filed: Jul. 20, 2007

(65) Prior Publication Data

US 2008/0083872 A1  Apr. 10, 2008

Related U.S. Application Data

(60) Provisional application No. 60/849,281, filed on Oct. 4, 2006.

(51) Int. Cl.
*G01V 5/08* (2006.01)
*G01V 5/12* (2006.01)

(52) U.S. Cl. .................. 250/269.1; 250/269.3

(58) Field of Classification Search ........... 250/269.3, 250/269.1
See application file for complete search history.

(56) References Cited

U.S. PATENT DOCUMENTS

| | | | |
|---|---|---|---|
| 3,202,822 A | 8/1965 | Kehler | 250/83.3 |
| 3,321,625 A | 5/1967 | Wahl | 250/71.5 |
| 3,846,631 A | 11/1974 | Kehler | 250/269 |
| 3,858,037 A | 12/1974 | Moore et al. | 235/193 |
| 3,864,569 A | 2/1975 | Tittman | 250/264 |
| 4,628,202 A | 12/1986 | Minette | 250/269 |
| 4,879,463 A | 11/1989 | Wraight et al. | |
| 5,912,460 A | 6/1999 | Stoller et al. | |
| 6,307,199 B1 | 10/2001 | Edwards et al. | |
| 6,584,837 B2 | 7/2003 | Kurkoski | 73/152.02 |
| 6,648,083 B2 | 11/2003 | Evans et al. | |
| 6,907,944 B2 | 6/2005 | Sale et al. | |
| 7,114,565 B2 | 10/2006 | Estes et al. | 166/255.2 |
| 2003/0057366 A1* | 3/2003 | Gzara et al. | 250/269.3 |
| 2005/0028586 A1 | 2/2005 | Smits et al. | |

OTHER PUBLICATIONS

G.L. Moake et al.; *Improved Density Log Lithology Identification Using a Borehole-Compensated Photoelectric Factor*, SPWLA Twenty-Eighth Annual Logging Symposium, Jun. 29-Jul. 2, 1987, pp. 1-23, 13 Figs.

J.S. Wahl et al.; *The Dual Spacing Formation Density Log*, Journal of Petroleum Technology, Dec. 1964, pp. 1411-1416, 13 Figs.

G.L. Moake et al., A New Approach to Determining Compensated Density and Pe Values with a Spectral-Density Tool, SPWLA 32nd Annual Logging Symposium, Jun. 16-19, 1991, pp. 1-24.

(Continued)

*Primary Examiner*—David P Porta
*Assistant Examiner*—Mindy Vu
(74) *Attorney, Agent, or Firm*—Madan & Sriram, P.C.

(57) ABSTRACT

A photoelectric factor (PEF) that is corrected for standoff effects is obtained from measurements made with a single detector. A first PEF is obtained using a first pair of soft and hard windows and a second PEF is obtained using a second pair of soft and hard windows. Additional correction to the PEF may be made using a formation density measured by the logging tool.

20 Claims, 6 Drawing Sheets

OTHER PUBLICATIONS

G.L. Moake et al., Improved Density Log Lithology Identification Using a Borehole-Compensated Photoelectric Factor, SPWLA 28th Annual Logging Symposium, Jun. 29-Jul. 2, 1987, pp. 1-23.

W.E. Schultz et al., SPWLA 26th Annual Logging Symposium, Jun. 17-20, 1985, pp. 1-20.

J.S. Gardner et al., Litho-Density Log Interpretation, SPWLA 21st Annual Logging Symposium, Jul. 8-11, 1980, pp. 1-23.

W. Bertozzi et al., The physical foundation of formation lithology logging with gamma rays, Geophysics, vol. 46, No. 10 (Oct. 1981), pp. 1439-1455.

D. Ellis et al., Litho-Density Tool Calibration, SPE 12048, SPE 58th Annual Technical Conference, 1985, pp. 515-520.

* cited by examiner

MEASUREMENT OF STANDOFF CORRECTED PHOTOELECTRIC FACTOR

CROSS-REFERENCES TO RELATED APPLICATIONS

This application claims priority from U.S. provisional patent application Ser. No. 60/849,281 filed on Oct. 4, 2006.

BACKGROUND OF THE DISCLOSURE

1. Field of the Disclosure

The present disclosure relates in general to using nuclear radiation measurements to measure formation characteristics in petroleum exploration. More particularly, the present disclosure provides a method for calibrating the effects of standoff on radiation measurements obtained with an apparatus conveyed in a borehole.

2. Description of the Related Art

Oil well logging has been known for many years and provides an oil and gas well driller with information about the particular earth formation being drilled. In conventional oil well logging, after a well has been drilled, a probe known as a sonde is lowered into the borehole and used to determine some characteristic of the formations which the well has traversed. The probe is typically a hermetically sealed steel cylinder which hangs at the end of a long cable which gives mechanical support to the sonde and provides power to the instrumentation inside the sonde. The cable also provides communication channels for sending information up to the surface. It thus becomes possible to measure some parameter of the earth's formations as a function of depth, that is, while the sonde is being pulled uphole. Such "wireline" measurements are normally done in real time (however, these measurements are taken long after the actual drilling has taken place).

Examples of prior art wireline density devices are disclosed in U.S. Pat. Nos. 3,202,822; 3,321,625; 3,846,631; 3,858,037; 3,864,569 and 4,628,202. Wireline formation evaluation tools have many drawbacks and disadvantages including loss of drilling time, the expense and delay involved in tripping the drillstring so as to enable the wireline to be lowered into the borehole and both the build up of a substantial mud cake and invasion of the formation by the drilling fluids during the time period between drilling and taking measurements. An improvement over these prior art techniques is the art of measurement-while-drilling (MWD) in which many of the characteristics of the formation are determined substantially contemporaneously with the drilling of the borehole.

Measurement-while-drilling logging either partly or totally eliminates the necessity of interrupting the drilling operation to remove the drillstring from the hole in order to make the necessary measurements by wireline techniques. In addition to the ability to log the characteristics of the formation through which the drill bit is passing, this information on a real time basis provides substantial safety advantages for the drilling operation.

Testing equipment conveyed downhole transmits energy into the formation from an energy source and performs measurements at a suitable receiver. These measurements may include resistivity, acoustic, or nuclear measurements. In nuclear radiation testing, the measurement tool generally comprises a gamma ray source and at least two detectors, such as NaI detectors, placed along the axis of the tool, such as a near detector placed proximate the gamma ray source and a far detector placed distal the gamma ray source. The gamma ray source and gamma ray detectors are shielded from each other to prevent counting of radiation emitted directly from the source. The gamma ray source emits nuclear energy, and more particularly gamma rays (high energy photons), and the corresponding detectors record the interaction of the gamma rays with the surrounding formation. The measurements derived from these interactions can be used to obtain a formation density. These interactions include photoelectric absorption, Compton scattering, or pair production.

Compton scattering is an interaction by which energy is transferred from the gamma ray to the electrons in the formation. This interaction forms the basis of the density measurement. Since the number of scattered gamma rays which reach the detectors is directly related to the number of electrons in the formation, the tool responds to the electron density of the rocks, which is in turn related to the bulk density. In the Compton scattering process, the involved photon loses some of its energy while changing its original direction of travel, the loss being a function of the scattering angle. Some of the photons emitted from the source into the sample are accordingly scattered toward the detector. Many of these never reach the detector, since their direction is changed by a second Compton scattering, or they are absorbed by the photoelectric absorption process or the pair production process. The scattered photons that reach the detector and interact with it are counted by the electronic equipment associated with the detector.

The photoelectric effect describes the case in which a gamma ray interacts with and transfers its energy to an atomic electron, ejecting that electron from the atom. The kinetic energy of the resulting photoelectron is equal to the energy of the incident gamma photon minus the binding energy of the electron. The photoelectric effect is the dominant energy transfer mechanism for low energy gamma rays, but it is much less important at higher energies. Photoelectric absorption often occurs when the gamma rays reach a low energy level after being repeatedly scattered by other electrons in the formation. A photoelectric effect factor can be determined by comparing the counts in a high energy region, where Compton scattering dominates, with those in a low energy region, where neither Compton scattering nor photoelectric effects dominate the other.

A reliable density measurement preferably maintains good contact between pad and formation. One potential problem with MWD logging tools is that there can be variations in the spacing between the logging tool and the borehole wall ("standoff"). Nuclear measurements are particularly degraded by large standoffs due to the scattering produced by borehole fluids in the annular region between the tool and the formation. The far detector generally is used because it has a greater depth of investigation. The response of the short-spacing detector, which is mostly influenced by drilling mud and borehole rugosity, can be used to correct the density measurement for these effects.

Because a caliper measurement is typically made during the testing, it is possible to check the quality of the contact. The presence of drilling mud and hole irregularities are usually accounted for using a "spine and ribs" chart based on a series of laboratory measurements. A spine and ribs correction technique is well known in the nuclear well logging art of density logging. Such correction technique is based on a well known correction curve by Wahl, J. S., Tittman, J., Johnstone, C. W., and Alger, R. P., "The Dual Spacing Formation Density Log", presented at the Thirty-ninth SPE Annual Meeting, 1964. Such curve includes a "spine" which is a substantially linear curve relating the logarithm of long spacing detector count rates to the logarithm of short spacing detector count rates. Such curve is marked by density as a parameter along the curve. "Ribs" cross the spine at different intervals. Such ribs are experimentally-derived curves showing the correction necessary for different mudcake conditions. The short and long spacing readings are automatically plotted on this chart and corrected for their departure from true value.

Accounting for the standoff between logging tool and formation is an important aspect of obtaining accurate radiation measurements of formation properties. The present disclosure provides a method of calibrating a density measurement for standoff effects using a single detector spectrum without using caliper measurements.

SUMMARY OF THE DISCLOSURE

One embodiment of the present disclosure is a method of estimating a photoelectric factor (PEF) of an earth formation. The earth formation is irradiated from within a borehole. Gamma ray counts resulting from the irradiating are measured. A first value of the PEF and a second value of the PEF are estimated using the measured gamma ray counts. A first corrected value of the PEF is estimated using a difference between the first and second estimated values. The first estimated corrected value of the PEF is recorded on a suitable medium. Estimating the first value of the PEF may be done using measured gamma ray counts within a first hard spectral window and a first soft spectral window, and estimating the second value of the PEF may be done using measured gamma ray counts within a second hard spectral window and a second soft spectral window. Irradiating the earth formation may be done using a gamma ray source. The first corrected value of the PEF may be estimated using a calibration measurement in a sample formation. The method may further include applying a density correction to the first estimated corrected value to give a second estimated corrected value of the PEF. The density correction may include using a relationship of the form:

$$Pecor(r1,r2,\rho)=Pe1(r1)-f(\rho)Pe2(r2)$$

$$f(\rho)=1.14-0.07\rho \text{ if } \rho>2.0 \text{ gm/cc}, f(\rho)=1 \text{ if } \rho \leq 2.0 \text{ gm/cc}$$

where r1 is a ratio of the gamma ray counts in the first hard spectral window and the first soft spectral window, where r3 is a ratio of the gamma ray counts in the second hard spectral window and the second soft spectral window, ρ is a formation density, Pe1 and Pe2 are the first and second estimated values of the PEF, Pecor is the correction to the PEF, and f(ρ) is a correction factor. The method may further include estimating the density using the measurements at the detector and measurements at another detector. The method may further include measuring additional gamma ray counts at an additional detector and using the additional measurements in determination of the PEF. The first soft window and the second soft window are within the range of about 50 keV to 150 keV. The method may further include conveying a source of the irradiation on a downhole assembly using a drilling tubular and/or a wireline.

Another embodiment of the present disclosure is an apparatus for estimating a photoelectric factor (PEF) of an earth formation. The apparatus includes a source of irradiation configured to irradiate the earth formation from within a borehole and a detector configured to measure gamma ray counts resulting from the irradiating. The apparatus also includes a processor configured to estimate a first value of the PEF and a second value of the PEF using the measured gamma ray counts, estimate a first corrected value of the PEF using a difference between the estimated first value and the estimated second value, and record the estimated first corrected value on a suitable medium. The processor may be further configured to estimate the first value of the PEF using gamma ray counts within a first hard window and a first soft window, and estimate the second value of the PEF using gamma ray counts within a second hard window and a second soft window. The source of irradiation may be a gamma ray source. The processor may be further configured to estimate the first corrected value of the PEF using a calibration measurement in a sample formation. The processor may be further configured to apply a density correction to the estimated first corrected value of the PEF to give a second corrected value of the PEF. The apparatus may include another detector configured to make additional measurements resulting from the irradiating, and the processor may be further configured to use the additional measurements in determination of the PEF. The first soft window and the second soft window may be within a range of about 50 keV and about 150 keV. The source of irradiation may be disposed on a downhole assembly, and the apparatus may further include a conveyance device configured to convey the downhole assembly into the borehole, the conveyance device being a drilling tubular and/or a wireline.

Another embodiment of the present disclosure is a computer readable medium for use with an apparatus for estimating a photoelectric factor (PEF) of an earth formation. The apparatus includes a source of irradiation configured to irradiate the earth formation from within a borehole, and a detector configured to measure gamma ray counts resulting from the irradiating. The medium includes instructions which enable a processor to estimate a first PEF from gamma ray counts within a first hard spectral window and first soft spectral window of measurements made by a detector on the logging tool. The medium further includes instructions which enable the processor to further estimate a second PEF using gamma ray counts within a second hard spectral window and a second soft spectral window, and to use the difference between the two estimated PEFs to correct the first of the two estimated PEFs. The medium may include a ROM, an EPROM, an EAROM, a flash memory and/or an optical disk.

BRIEF DESCRIPTION OF THE DRAWINGS

The present disclosure is best understood with reference to the accompanying figures in which like numerals refer to like elements and in which.

DETAILED DESCRIPTION OF THE DISCLOSURE

Figure 1:
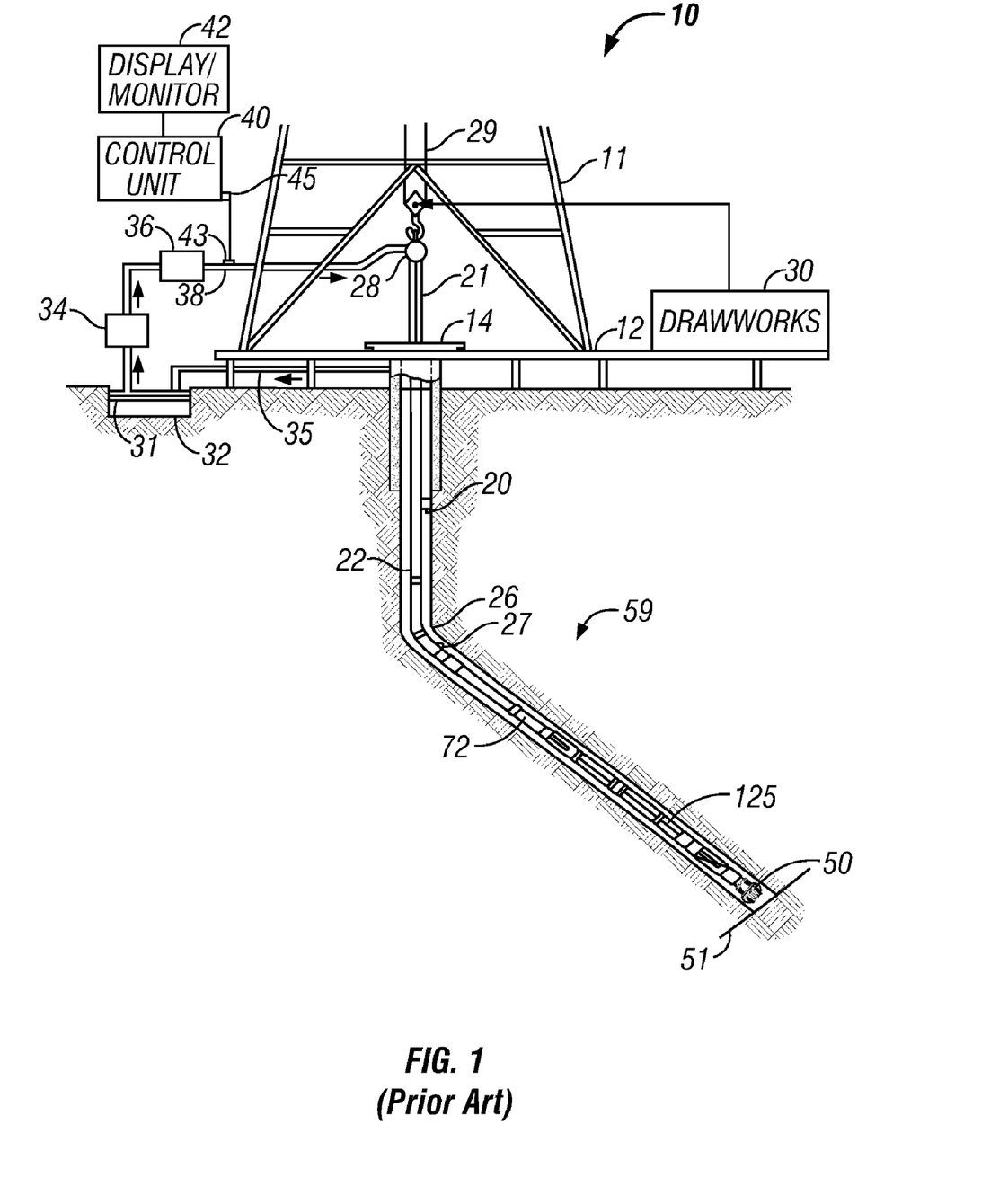
FIG. 1 (prior art) shows a schematic diagram of a drilling system having a downhole assembly containing a downhole sensor system and the surface devices according to one embodiment of present disclosure.

FIG. 1 shows a schematic diagram of a drilling system 10 having a downhole assembly containing a downhole sensor system and the surface devices according to one embodiment of present disclosure. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a wellbore 26. A drill bit 50 attached to the drill string downhole end disintegrates the geological formations when it is rotated. The drill string 20 is coupled to a drawworks 30 via a kelly joint 21, swivel 28 and line 29 through a system of pulleys (not shown). During the drilling operations, the drawworks 30 is operated to control the weight on bit and the rate of penetration of the drill string 20 into the wellbore 26. The operation of the drawworks is well known in the art and is thus not described in detail herein. Alternatively, a coiled tubing system (not shown), as is known in the art, may be used to convey tools in the wellbore.

During drilling operations, a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a desurger 36, fluid line 38 and the kelly joint 21. The drilling fluid is discharged at the wellbore bottom 51 through an opening in the drill bit 50. The drilling fluid circulates uphole through the annular space 27 between the drill string 20 and the wellbore 26 and is discharged into the mud pit 32 via a return line 35. A variety of sensors (not shown) may be appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit. The surface control unit displays desired drilling parameters and other information on a display/monitor 42 which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The control unit 40 may be adapted to activate alarms when certain unsafe or undesirable operating conditions occur.

In one embodiment of the system of present disclosure, the downhole subassembly 59 (also referred to as the bottomhole assembly or "BHA"), which contains the various sensors and MWD devices to provide information about the formation and downhole drilling parameters, is coupled between the drill bit 50 and the drill pipe 22. The downhole assembly 59 is modular in construction, in that the various devices are interconnected sections.

Referring to FIG. 1, the BHA 59 may also include downhole sensors and devices in addition to the above-described surface sensors to measure downhole parameters of interest. Such devices include, but are not limited to, a device for measuring the formation resistivity near the drill bit, a gamma ray device for measuring the formation natural gamma ray emission intensity, devices for determining the inclination and azimuth of the drill string, and a nuclear device 125 for measuring formation density.

The above-noted devices transmit data to the downhole telemetry system 72, which in turn transmits the sensor data uphole to the surface control unit 40. The present disclosure may use a mud pulse telemetry technique to communicate data from downhole sensors and devices during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. Other telemetry techniques such electromagnetic and acoustic techniques or any other suitable technique may be utilized for the purposes of this disclosure.

Figure 2:
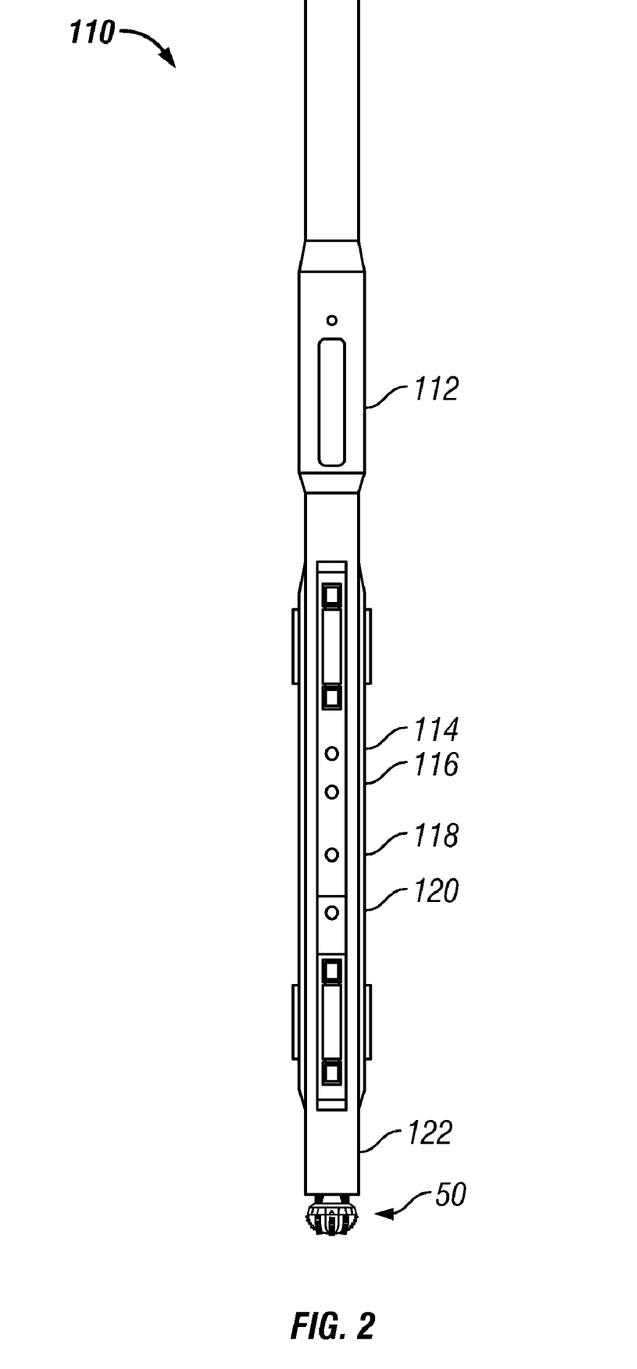
FIG. 2 shows a diagram of the basic components of a borehole assembly including an exemplary gamma-ray density tool.

FIG. 2 shows a diagram of the basic components of a borehole assembly including an exemplary gamma-ray density tool. This tool comprises an upper section of a bottomhole assembly including a drill collar 110. A logging tool contains a gamma-ray source 114 and two spaced gamma-ray detector assemblies 116 and 118. All three components are placed along a single axis that has been located parallel to the axis of the tool. The detector 116 closest to the gamma-ray source is referred to as the "short space detector" (SS) and the one farthest away 118 is referred to as the "long space detector" (LS). Gamma-ray shielding (not shown) is located between detector assemblies 116, 118 and source 114. Windows (ports) open up to the formation from both the detector assemblies and the source. The acoustic caliper (A1) 120 is inline and close to the gamma detectors (LS & SS). A layer of drilling fluid (mud) is present between the formation and the detector assemblies and source. Also shown in FIG. 2 are the lower section of the bottomhole assembly 122 and drill bit 50 and one or more additional sensor assemblies 112.

Gamma rays from the source 114 are introduced in to the surrounding formation and interact with the formation via Compton scattering, photoelectric absorption, and pair production. The results of the interaction are recorded at the LS 118 and SS 116 detectors. In general, Compton scattering and photoelectric absorption both substantially contribute to the LS and SS measurements. An electron that enters a detector and registers an electronic signal is referred to as a "count."

Figure 3:
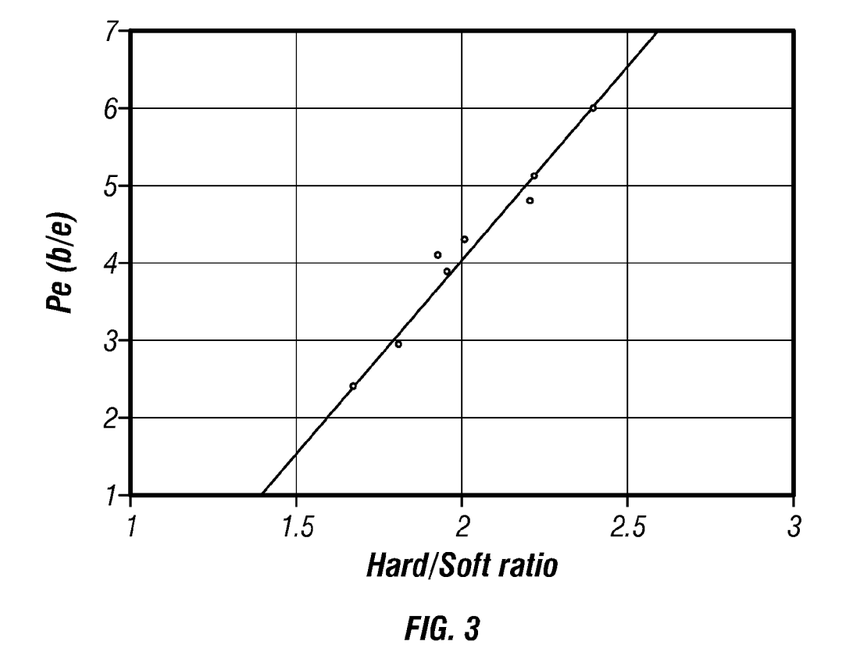
FIG. 3 illustrates a relationship between a ratio of hard and soft gamma radiation measurements and the photoelectric factor.

FIG. 3 illustrates a relationship between a ratio of hard (high-energy) and soft (low energy) gamma radiation measurements and the photoelectric factor (Pe). The photoelectric factor (Pe) is a measurement that records the absorption of low-energy gamma rays by the formation in units of barns per electron (b/e). The photoelectric factor (Pe) is commonly derived from the ratio of detected gamma counts in a high-energy (hard) window and low energy (soft) window of a spectrum recorded at a detector. The Pe may be computed from either detector. However, the near detector is generally used due to its better collimation and better statistics. The resulting value is a direct function of the aggregate atomic number (Z) of the elements in the formation, and so is a sensitive indicator of mineralogy. The photoelectric factor is commonly scaled on a range between 0 and 10 b/e. Common reservoir mineral reference values are: quartz 1.81; dolomite 3.14; and calcite 5.08 b/e. The measurements shown in FIG. 3 are obtained from blocks of known density $\rho$ and photoelectric factor (Pe) by a Logging-While-Drilling density tool with zero standoff. The linear relationship displayed in FIG. 3 may be represented by Pe=A+Br where r=the ratio of hard counts to soft counts. Not much improvement to the fit is obtained by using a quadratic or higher order terms in the equation over the normal range of interest.

Standoff will effect the Pe measurements and while it is possible to fashion a Pe compensation technique after that of the density, the conditions that allow the density compensation technique to work do not apply equally well to the Pe measurement (ref. G. L. Moake and W. E. Schultz, SPWLA Twenty-Eighth Annual Logging Symposium, Jun. 29-Jul. 2, 1987). A technique that relies on an independent measurement of standoff, such as provided by an acoustic transducer, suffers from inaccuracies of the standoff measurement and distance between the density detector(s) and standoff sensor. Moreover, mud weight and/or mud composition would have to be input for such a correction scheme.

In one embodiment of the present disclosure, a standoff correction method has been implemented that is entirely based on the gamma spectrum measured by a single detector and does not require input of an independent standoff measurement and/or mud properties. The effect that standoff has on Pe measurements may be detected using multiple values obtained by using different soft and hard windows of a single spectrum. Gamma counts detected at the measurement tool that have lower energy will generally have undergone more scattering interactions and have penetrated the formation deeper than gamma counts of higher energy which have generally had few scattering interactions.

Figure 4:
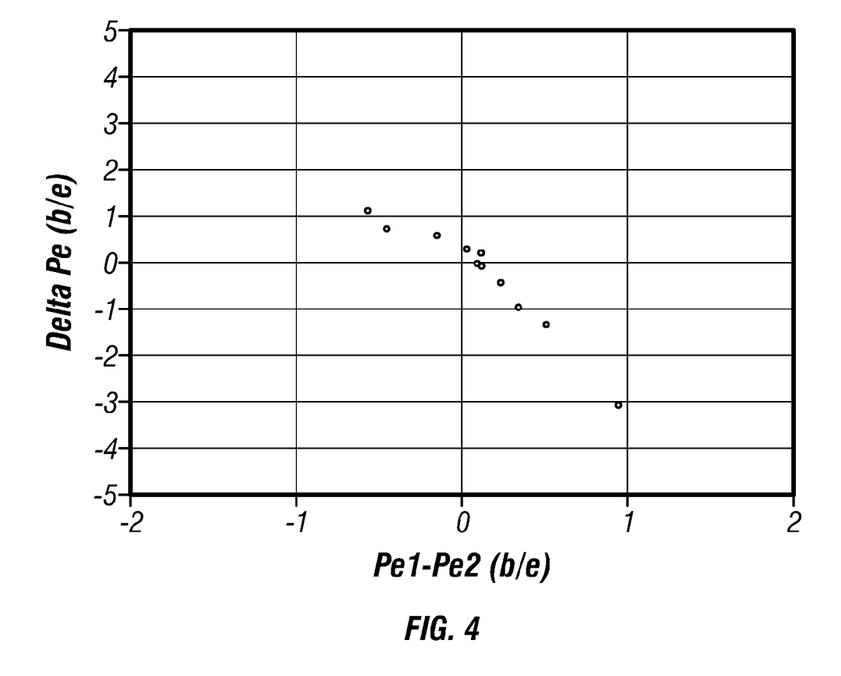
FIG. 4 shows an exemplary graph of standoff correction as a function of the difference of two photoelectric factors.

FIG. 4 shows an exemplary graph of standoff correction ΔPe as a function of the difference of two photoelectric factors, such as Pe1 and Pe2 used to obtain a correction to a measured photoelectric factor. Typically, the two photoelectric factors, Pe1 and Pe2, are obtained at a single detector, such as the SS detector 116. A first Pe measurement (Pe1) may be derived from measurements obtained using a first set of soft and hard windows, and a second Pe measurement (Pe2) may be derived from measurements obtained using a second set of soft and hard windows. In an exemplary embodiment the first set of soft and hard windows are 60-100 keV and 180-540 keV, respectively and the second set of soft and hard windows are 100-140 keV and 260-540 keV, respectively. From a reading of Pe1 and Pe2, one may determine the effect of standoff ΔPe and thereby make appropriate adjustments to a Pe factor recorded at the measurement device to achieve a more accurate value. The exemplary data shown in FIG. 4 represent measurements obtained from a formation block with a density of 2.2 g/cc and a Pe of 4.3 b/e, with standoff of up to ¾" and borehole fluid ranging from water to 18 ppg mud. A clear relationship is seen to exist between the difference of Pe1 and Pe2 (the abscissa) and the correction term ΔPe (the difference between the actual Pe and Pe1).

Figure 5:
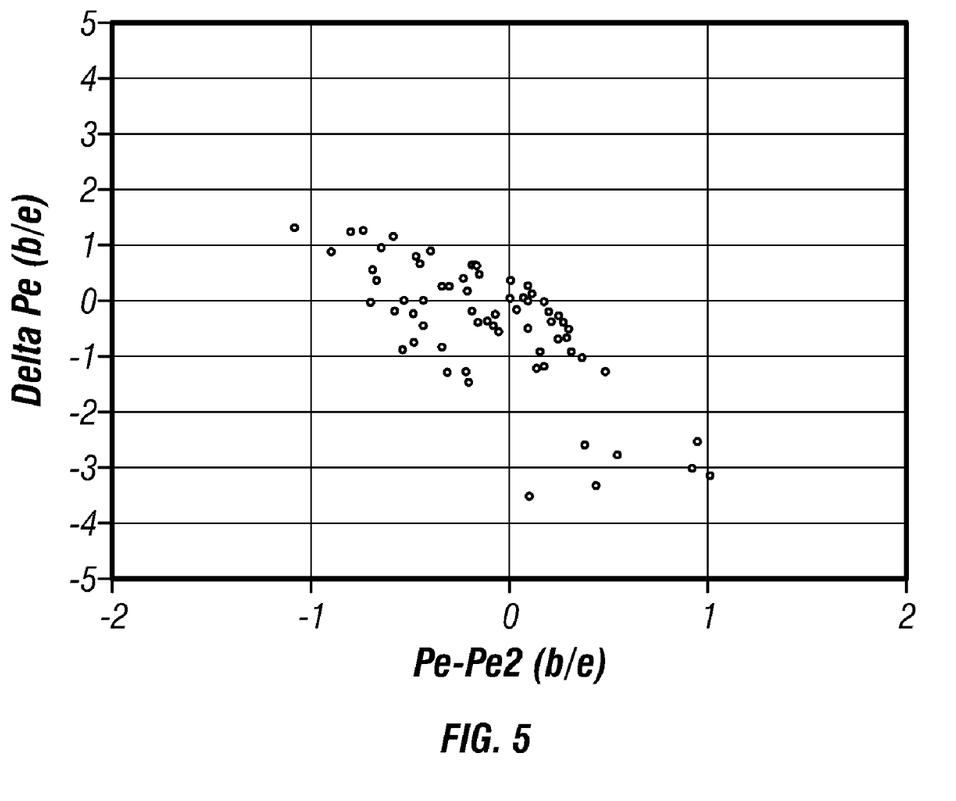
FIG. 5 illustrates the effects of density on the standoff correction to the photoelectric factor when graphed against the difference of two photoelectric factors.

FIG. 5 illustrates the effects of density on the standoff correction to the photoelectric factor when graphed against the difference of two photoelectric factors. Data is plotted for formation blocks ranging in density from 1.7 g/cc to 3.0 g/cc. In general, ΔPe is not solely a function of Pe, but is also a function of density, thereby contributing to the spread of data points.

As density is measured by the tool itself, the correction ΔPe may be described as a function of Pe1, Pe2 and formation density.

$$Pecor(r1,r2,\rho)=Pe1(r1)-f(\rho)Pe2(r2)$$

$$f(\rho)=1.14-0.07\rho \text{ if } \rho>2.0 \text{ gm/cc}, f(\rho)=1 \text{ if } \rho\leq2.0 \text{ gm/cc} \quad (1)$$

$$\Delta Pe(Pecor)=-Pecor^2-2Pecor \quad (2).$$

The Pe standoff correction is analogous to the commonly used "spine-and-rib" method used for density standoff correction (e.g., the far density corresponds to Pe1, the near density corresponds to Pe2 and ΔPe corresponds to Δρ). An important difference, however, is that both Pe terms are derived from a single detector spectrum.

It should be noted that a corrected density measurement may be used in equation (1). The corrected density may be estimated using the spine and rib method and two or more detectors and without a standoff measurement. Alternatively, the corrected density estimate may be improved by using a standoff measurement such as that described in U.S. Pat. No. 6,584,837 to Kurkoski having the same assignee as the present disclosure and the contents of which are incorporated herein by reference.

The improvement in standoff response may be evaluated by computing the sum of the squares of the difference between measured and actual Pe values:

$$\sum_i (Pe_{i,measured} - Pe_{i,actual})^2 \quad (3)$$

where i denotes the individual tool characterization measurements acquired in blocks of various density and Pe values, at various standoffs and in muds of various weight. Table 1 compares results obtained using two density tools. Results are shown if no standoff correction is applied and with the method of the present disclosure.

TABLE 1

| | $\sum_i (Pe_{i,measured} - Pe_{i,actual})^2$; $Pe_{measured} < 10$ | |
|---|---|---|
| | Tool #1 | Tool #2 |
| Number of data points | 144 | 112 |
| Without standoff correction | 339.2 | 281.3 |
| Using method of present disclosure | 32.5 | 32.4 |

Table 2 compares of corresponding standard deviation results obtained with no standoff correction and the method of the present disclosure. An improved standard deviation is achieved using the method of the present disclosure.

TABLE 2

| | $\sqrt{\frac{1}{N}\sum_i (Pe_{i,measured} - Pe_{i,actual})^2}$ ; $Pe_{measured} < 10$ | |
|---|---|---|
| | Tool #1 | Tool #2 |
| Number of data points | 144 | 112 |
| Without standoff correction | 1.53 | 1.58 |
| Using method of present disclosure | 0.48 | 0.54 |

Figure 6A:
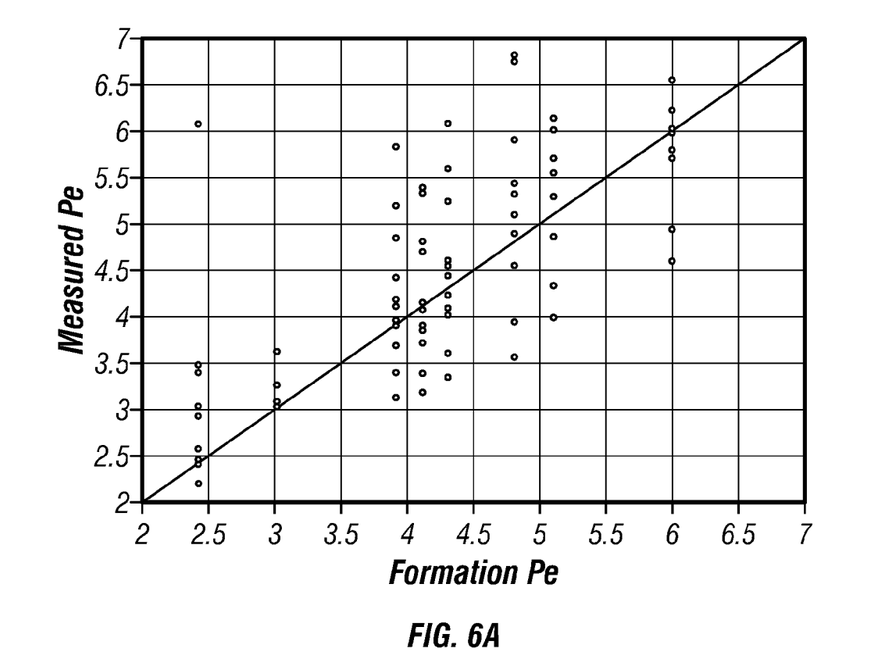
FIGS. 6A, 6B and 7A, 7B show graphical comparisons between the Pe obtained with a prior art method and the method of the present disclosure.
Figure 6B:
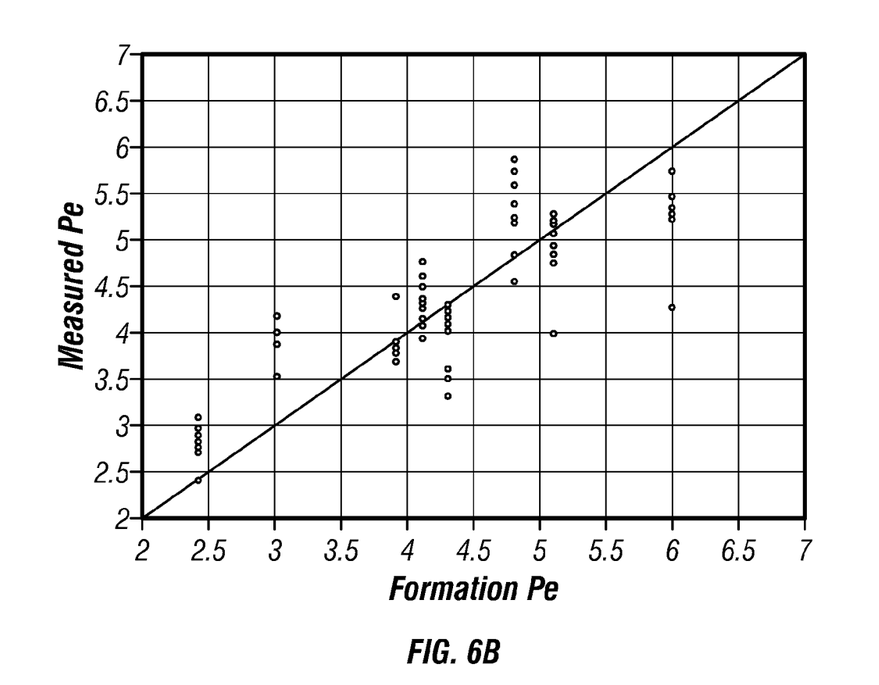
Figure 7A:
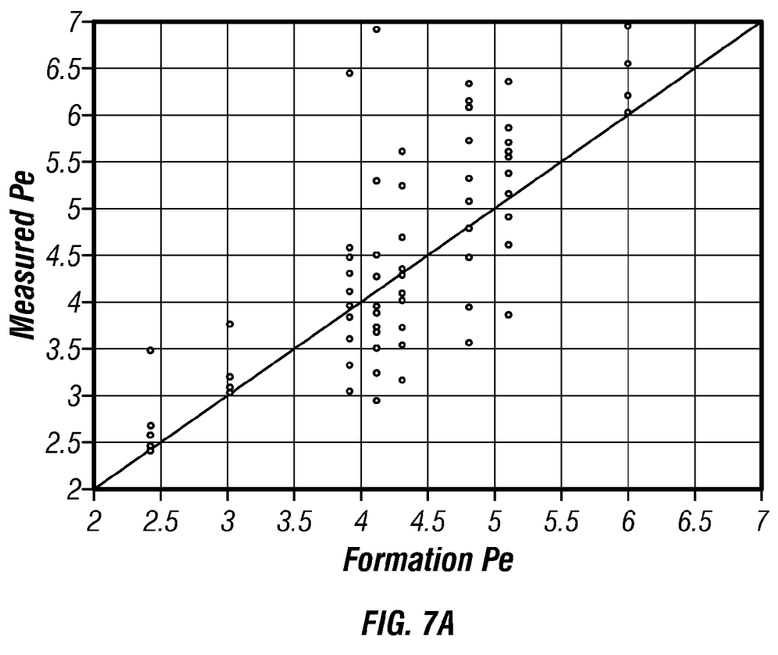
Figure 7B:
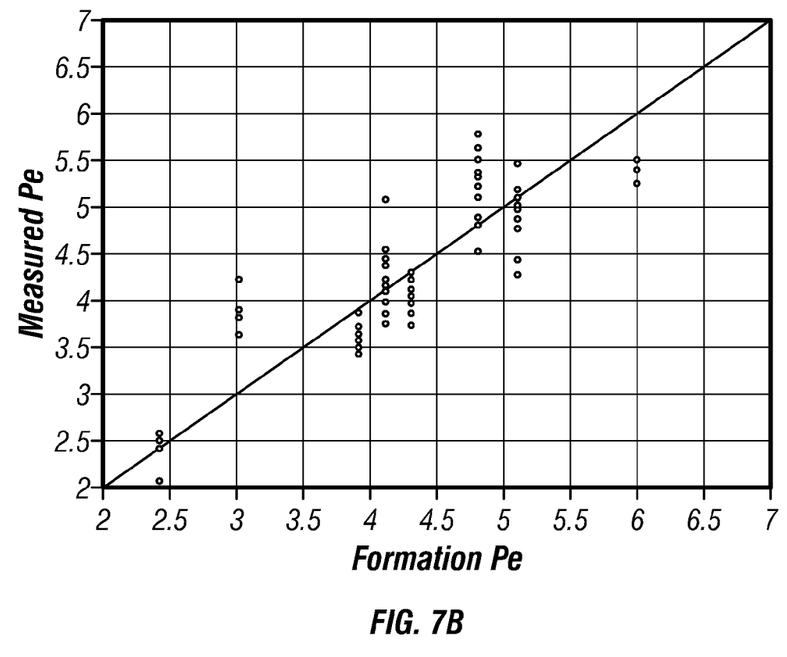

FIGS. 6 and 7 show graphical comparisons between the Pe obtained with the prior art method (i.e. without standoff correction) and the method of the present disclosure for two different tools. The abscissa is the formation Pe and the ordinate is the measured Pe. FIG. 6 shows a comparison of results obtained with a first tool using a prior art method (FIG. 6A) and the method of the present disclosure (FIG. 6B). FIG. 7 shows a comparison of results obtained for a second tool using a prior art method (FIG. 7A) and the method of the present disclosure (FIG. 7B). It is seen that the method of the present disclosure, on average, significantly improves the Pe measurement.

It has been noted that the method of the present disclosure is less reliable if high Pe values are measured due to large standoff in high density mud. Under those conditions, the Pe measurement is dominated by the mud properties. In an alternate embodiment of the disclosure, correction for the Pe measurement for the effects of standoff is done by parameterization of the Pe response as a function of standoff and mud weight. These parameterizations may subsequently be used in the form of correction charts or be used in conjunction with measurements.

The method of the present disclosure envisages producing borehole images of Pe. A Pe image consists of measurements of the Pe as a function of azimuth and depth. The images may help identify geological features of interest (formation beds, fractures). In order to provide an accurate image, the Pe measurement needs to be corrected for the, generally, varying standoff of the rotating MWD density tool. The method described in U.S. Pat. No. 7,114,565 to Estes et al., having the same assignee as the present disclosure and the contents of which are incorporated herein by reference may be used. As described in Estes, the data from the toolface orientation sensors are analyzed by a processor and toolface angle measurements are determined at defined intervals. Formation evaluation sensors operate substantially independently of the toolface orientation sensors and measurements of the formation evaluation sensors are analyzed in combination with the determined toolface angle to obtain formation parameters.

Since the photo-electric effect depends strongly on the atomic number of the formation elements, it provides an indication of the lithology of the formation. The knowledge lithology and rock properties thus may be used for an operational decision in the formation evaluation. The decision may include such activities as drilling additional wells, deciding on which logs to run in the same well using a wireline, decisions on reservoir development. The estimated values of PEF may be recorded on a suitable medium.

While the disclosure above has been made with reference to a logging tool conveyed on a bottomhole assembly by a drilling tubular, this is not to be construed as a limitation. The method described above may also be used on a logging string conveyed on a wireline. For the purposes of this disclosure, the logging string and the bottomhole assembly may be referred to as a downhole assembly.

Implicit in the control and processing of the data is the use of a computer program implemented on a suitable machine readable medium that enables the processor to perform the control and processing. The machine readable medium may include ROMs, EPROMs, EAROMs, Flash Memories and Optical disks.

What is claimed is:

1. A method of estimating a photoelectric factor (PEF) of an earth formation, the method comprising:
    (a) irradiating the earth formation from within a borehole;
    (b) measuring gamma ray counts resulting from the irradiating using a detector;
    (c) estimating a first value of the PEF using the measured gamma ray counts within a first hard spectral window and a first soft spectral window and a second value of the PEF using the measured gamma ray counts within a second hard spectral window and a second soft spectral window;
    (d) estimating a first corrected value of the PEF using a difference between the estimated first value of the PEF and the estimated second value of the PEF; and
    (e) recording the estimated first corrected value of the PEF on a suitable medium.

2. The method of claim 1 wherein irradiating the earth formation further comprises using a gamma ray source.

3. The method of claim 1 wherein estimating the first corrected value of the PEF further comprises using a calibration measurement in a sample formation.

4. The method of claim 1 further comprising applying a density correction to the estimated first corrected value of the PEF to give a second estimated corrected value of the PEF.

5. The method of claim 4 wherein applying the density correction further comprises using a relationship of the form:

$$Pecor(r1,r2,\rho)=Pe1(r1)-f(\rho)Pe2(r2)$$

$$f(\rho)=1.14-0.07\rho \text{ if } \rho>2.0 \text{ gm/cc}, f(\rho)=1 \text{ if } \rho\leq2.0 \text{ gm/cc}$$

where r1 is a ratio of the gamma ray counts in the first hard spectral window and the first soft spectral window, where r3 is a ratio of the gamma ray counts in the second hard spectral window and the second soft spectral window, $\rho$ is a formation density, Pe1 and Pe2 are the first and second estimated values of the PEF, Pecor is the correction to the PEF, and $f(\rho)$ Is a correction factor.

6. The method of claim 5 further comprising estimating the density using the measurements of the gamma rays at the detector and measurements of gamma rays at another detector.

7. The method of claim 1 further comprising measuring additional gamma ray counts resulting from the irradiating at an additional detector and using the additional measurements in determination of the PEF.

8. The method of claim 1 wherein the first soft window and the second soft window are within a range of about 50 keV to about 150 keV.

9. The method of claim 1 further comprising conveying a source of the irradiation on a downhole assembly into the borehole using one of: (i) a drilling tubular, and (ii) a wireline.

10. An apparatus for estimating a photoelectric factor (PEF) of an earth formation, the apparatus comprising:
    (a) a source of irradiation configured to irradiate the earth formation from within a borehole;
    (b) a detector configured to measure gamma ray counts resulting from the irradiating; and
    (c) a processor configured to:
        (A) estimate a first value of the PEF using the measured gamma ray counts within a first hard window and a first soft window and a second value of the PEF using the measured gamma ray counts within a second hard window and a second soft window;
        (B) estimate a first corrected value of the PEF using a difference between the estimated first value of the PEF and the estimated second value of the PEF; and
        (C) record the estimated first corrected value of the PEF on a suitable medium.

11. The apparatus of claim 10 wherein the source of irradiation further comprises a gamma ray source.

12. The apparatus of claim 10 wherein the processor is further configured to estimate the first corrected value of the PEF further using a calibration measurement in a sample formation.

13. The apparatus of claim 10 wherein the processor is further configured to apply a density correction to the estimated first corrected value of the PEF to give a second corrected value of the PEF.

14. The apparatus of claim 13 wherein the processor is further configured to apply a density correction using a relationship of the form:

$$Pecor(r1,r2,\rho)=Pe1(r1)-f(\rho)Pe2(r2)$$

$$f(\rho)=1.14-0.07\rho \text{ if } \rho>2.0 \text{ gm/cc}, f(\rho)=1 \text{ if } \rho\leq2.0 \text{ gm/cc}$$

where r1 is a ratio of the gamma ray counts in the first hard spectral window and the first soft spectral window, where r3 is a ratio of the gamma ray counts in the second hard spectral window and the second soft spectral window, ρ Is a formation density, Pe1 and Pe2 are the first and second estimated values of the PEF, Pecor is the connection to the PEF, and f(ρ) is a connection factor.

15. The apparatus of claim 14 further comprising another detector configured to make additional measurements resulting from the irradiating, and wherein the processor is further configured to estimate the density using the additional measurements.

16. The apparatus of claim 10 further comprising another detector configured to make additional measurements resulting from the irradiating, and wherein the processor is further configured to use the additional measurements in determination of the PEF.

17. The apparatus of claim 10 wherein the first soft window and the second soft window are within a range of about 50 keV to about 150 keV.

18. The apparatus of claim 10 wherein a source of the irradiation is disposed on a downhole assembly, the apparatus further comprising a conveyance device configured to convey the downhole assembly into the borehole, the conveyance device being selected from the group consisting of: (i) a drilling tubular, and (ii) a wireline.

19. A computer-readable medium accessible to a processor, the computer-readable medium including instructions which enable the processor to
use measured gamma ray counts produced by a detector responsive to irradiation of an earth formation to:
estimate a first value of the PEF using gamma ray counts within a first hard spectral window and a first soft spectral window;
estimate a second value of the PEF using gamma ray counts within a second hard spectral window and a second soft spectral window;
estimate a first corrected value of the PEF using a difference between the estimated first value of the PEF and the estimated second value of the PEF; and
record the estimated first corrected value of the PEF on a suitable medium.

20. The medium of claim 19 further comprising at least one of: (i) a ROMs, (ii) an EPROM, (iii) an EAROM, (iv) a flash memory and (v) and optical disk.

* * * * *

UNITED STATES PATENT AND TRADEMARK OFFICE
CERTIFICATE OF CORRECTION

PATENT NO.         : 7,573,027 B2
APPLICATION NO.    : 11/780993
DATED              : August 11, 2009
INVENTOR(S)        : Cornelis Huiszoon It is certified that error appears in the above-identified patent and that said Letters Patent is hereby corrected as shown below:

Column 10, line 23, delete "r3", insert --r2--;

Column 10, claim 5, line 27, delete "Is a", insert --is a--;

Column 11, claim 14, line 14, delete "r3", insert --r2--;

Column 11, claim 14, line 16, delete "Is a", insert --is a--; and

Column 12, claim 18, line 4, delete "a source", insert --the source--.

Signed and Sealed this

Eighth Day of December, 2009

David J. Kappos
*Director of the United States Patent and Trademark Office*